(12) United States Patent
Tiberi et al.

(10) Patent No.: US 9,999,116 B2
(45) Date of Patent: Jun. 12, 2018

(54) TABLET-BASED COMMISSIONING TOOL FOR ADDRESSABLE LIGHTING

(71) Applicant: PHILIPS LIGHTING HOLDING B.V., Eindhoven (NL)

(72) Inventors: Luca Tiberi, Eindhoven (NL); Martijn Marius Hultermans, Eindhoven (NL); Ralf Gertruda Hubertus Voncken, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 1 day.

(21) Appl. No.: 15/110,848

(22) PCT Filed: Jan. 6, 2015

(86) PCT No.: PCT/EP2015/050075
§ 371 (c)(1),
(2) Date: Jul. 11, 2016

(87) PCT Pub. No.: WO2015/104248
PCT Pub. Date: Jul. 16, 2015

(65) Prior Publication Data
US 2016/0381767 A1    Dec. 29, 2016

(30) Foreign Application Priority Data
Jan. 10, 2014    (EP) .................................. 14150709

(51) Int. Cl.
*H05B 37/02*    (2006.01)
*G06F 17/30*    (2006.01)
(Continued)

(52) U.S. Cl.
CPC ....... *H05B 37/0272* (2013.01); *G06F 3/0482* (2013.01); *G06F 3/04817* (2013.01);
(Continued)

(58) Field of Classification Search
CPC ..... H05B 37/0272; F24F 11/009; G06F 17/30
See application file for complete search history.

(56) References Cited

U.S. PATENT DOCUMENTS 6,901,439 B1    5/2005  Bonasia et al.
7,889,051 B1 *  2/2011  Billig .................. H04L 12/2818
                                              340/286.01
(Continued)

FOREIGN PATENT DOCUMENTS

CN    102754038 A    10/2012
EP    2503854 A1     9/2012
(Continued)

*Primary Examiner* — Jennifer To
*Assistant Examiner* — Jasmine Wan
(74) *Attorney, Agent, or Firm* — Akarsh P. Belagodu

(57) ABSTRACT

The invention relates to a method enabling commissioning of a system comprising a plurality of controllable devices capable of transmitting their identification signals. The method includes receiving identification signals from the devices, displaying a map of a structure and icons corresponding to the devices from which the identification signals have been received, detecting a first user input indicating a selection by a user of a first icon from the displayed icons, the first icon corresponding to a first device, and, in response to the first user input, providing a command to the first device to issue a cue identifying the first device to the user. The method further includes, subsequent to the first device issuing the cue, detecting a second user input indicating a selection by the user of a location on the map for the first icon, and displaying the first icon on the map at the selected location.

12 Claims, 13 Drawing Sheets

(51) Int. Cl.
*G08C 17/02* (2006.01)
*G06F 3/0481* (2013.01)
*G06F 3/0482* (2013.01)
*G06F 3/0484* (2013.01)
*G06F 3/0488* (2013.01)
*H04L 12/24* (2006.01)

(52) U.S. Cl.
CPC ...... *G06F 3/04847* (2013.01); *G06F 3/04886* (2013.01); *G08C 17/02* (2013.01); *H04L 41/22* (2013.01); *G08C 2201/30* (2013.01)

(56) References Cited

U.S. PATENT DOCUMENTS

| | | | | |
|---|---|---|---|---|
| 9,374,874 | B1* | 6/2016 | Ewing | H05B 37/0272 |
| 2002/0089548 | A1* | 7/2002 | Marler | G06F 3/04842 |
| | | | | 715/810 |
| 2002/0154025 | A1 | 10/2002 | Ling | |
| 2004/0054428 | A1* | 3/2004 | Sheha | G01C 21/20 |
| | | | | 700/56 |
| 2008/0042827 | A1* | 2/2008 | Ho | G08B 13/1427 |
| | | | | 340/539.13 |
| 2008/0044188 | A1* | 2/2008 | Kagawa | H04B 10/1141 |
| | | | | 398/128 |
| 2010/0141851 | A1* | 6/2010 | Kendall | G06F 3/0231 |
| | | | | 348/734 |
| 2011/0276151 | A1* | 11/2011 | Feri | H05B 33/0803 |
| | | | | 700/83 |
| 2012/0086345 | A1* | 4/2012 | Tran | F24F 11/0009 |
| | | | | 315/158 |
| 2012/0306621 | A1* | 12/2012 | Muthu | H05B 37/0272 |
| | | | | 340/8.1 |
| 2013/0181614 | A1 | 7/2013 | Agrawal | |
| 2014/0280316 | A1* | 9/2014 | Ganick | G06F 17/30522 |
| | | | | 707/769 |

FOREIGN PATENT DOCUMENTS

| | | |
|---|---|---|
| JP | 2009521089 A | 5/2009 |
| JP | 2011204656 A | 10/2011 |
| JP | 2013110636 A | 6/2013 |
| JP | 2013065465 A | 11/2013 |
| WO | 2006095317 A1 | 9/2006 |
| WO | 2006136985 A1 | 12/2006 |
| WO | 2010004488 A1 | 1/2010 |
| WO | 2010079400 A1 | 7/2010 |
| WO | 2013121311 A1 | 8/2013 |

* cited by examiner

TABLET-BASED COMMISSIONING TOOL FOR ADDRESSABLE LIGHTING

CROSS-REFERENCE TO PRIOR APPLICATIONS

This application is the U.S. National Phase application under 35 U.S.C. § 371 of International Application No. PCT/EP2015/050075, filed on Jan. 6, 2015, which claims the benefit of European Patent Application No. 14150709.5, filed on Jan. 10, 2014. These applications are hereby incorporated by reference herein.

FIELD OF THE INVENTION

Embodiments of the present invention relate generally to the field of illumination systems, and, more specifically, to systems and methods for commissioning such illumination systems.

DESCRIPTION OF THE RELATED ART

Commissioning is a key activity in the deployment of current lighting systems. In short, commissioning refers to the process of configuring a lighting system that takes place after the components of the system, such as e.g. light sources, sensors and wall switches, are installed in a structure and connected to power and, if necessary, to a data network. Each of the installed components typically has a unique identifier associated with it. What is available to a commissioning engineer right after the installation is a list of the identifiers of all of the components installed and a floor plan of the structure. However, at that point, it is not known where exactly within the structure each of the components is actually installed. Therefore, in the beginning of the commissioning process, location information with respect to the light sources needs to be collected by mapping the unique identifiers of each of the light sources onto the floor plan of the structure. Such location information needs to be made available in an electronic form, in order to facilitate automation of further aspects of commissioning and in order to facilitate automation of controlling the system further down the line.

Currently, there are two methods for mapping the location information for the light sources onto the floor plan of the structure.

The first method is sometimes referred to as a "blinking method" because it involves one commissioning engineer that selects a network address from a list of light sources, thus triggering the light source, and the correspondent light source starts to blink, while another commissioning engineer walks around the building to visually identify the blinking light source and calls the first commissioning engineer on a mobile phone to describe the location of the light source within the building. One problem with such an approach is that, with a large lighting system, identifying all of the light sources one by one in this manner could be a very lengthy process.

The second method is sometimes referred to as a "barcode method" because it is based on using barcodes. Each light source installed in the structure is associated with a respective barcode which provides a unique identifier of the light source and can be read via a scanner. During the installation of the light sources, an installer sticks the barcode of each installed light source on a printout of the floor plan, based on where the light source was installed. After that, a commissioning engineer in possession of such printouts with barcodes can either read the barcodes via a scanner or typed them in manually to obtain location information in the electronic form. Not only can this process be, again, time consuming, particularly with large lighting systems, but it is also error prone both on the part of the installer sticking the barcodes in the correct places on the print out and on the part of the commissioning engineer transferring this information into the electronic format.

What is needed in the art is a technique that enables commissioning of a system comprising controllable devices, in particular lighting system comprising light sources, in a manner that improves on at least some of the problems described above.

SUMMARY OF THE INVENTION

One object of the invention is to provide a device and a computer-implemented method that enables commissioning of a system comprising a plurality of controllable devices. The provided device preferably comprises a portable electronic device comprising at least a display, one or more processors, and a memory, and the provided computer-implemented method is configured to be carried out by the portable electronic device. The proposed method is applicable to systems where each device of the plurality of controllable devices is capable of transmitting an identification signal comprising a unique identifier (ID) of the device. The method includes steps of wirelessly receiving a plurality of identification signals from the plurality of devices, and, in response to wirelessly receiving the plurality of identification signals, displaying on the display of the portable electronic device a map of the structure and a plurality of icons corresponding to the plurality of devices for which the plurality of identification signals has been received. The method also includes the step of detecting a first user input indicative of a selection by a user of a first icon of the plurality of icons displayed on the display, the first icon corresponding to a first device. The portable electronic device may be configured for controlling the plurality of the devices over a control network. The method further includes the step, performed in response to detecting the first user input, of providing a control command, e.g. over the control network, to the first device to issue a visual cue and/or an audio cue identifying the first device to the user. The method further includes steps of, subsequent to the first device issuing the visual cue and/or the audio cue, detecting a second user input indicative of a selection by the user of a location on the displayed map for the first icon, and displaying the first icon on the map in the location selected by the user.

The icons displayed on the display consist of the icons for only those devices for which the plurality of identification signals has been received. In other words, there is a causal link between the receipt of identification signals from the devices and the display of the corresponding icons on the display where it is the receipt of the identification signals that causes the display of the corresponding icons. If an identification signal for a particular other controllable device of the system is not received, then a corresponding icon for that device is not displayed.

Embodiments of the present invention are based on several recognitions. First of all, having the controllable devices transmit their identification signals has been recognized to allow automatic discovery of the controllable devices that have been installed in the structure. Second, providing a user with a portable electronic device that is configured to display icons for the controllable devices that have been discovered and that allows the user to control the controllable devices to identify themselves to the user enables the user to map the discovered controllable devices by assigning their icons to be displayed at certain locations on a map of the structure. In this manner, a computer-readable (i.e. electronic) location information is obtained where a map of the structure is populated with indications of the locations of the controllable devices within the structure. Such a populated map may then be used by a commissioning engineer, e.g. by means of a central controller, to control the installed system by e.g. configuring one or more operating parameters of the controllable devices, depending on their location within the structure.

In an embodiment, the location for the first icon selected by the user may comprise a location on the displayed map indicative of the (relative) physical location of the first device in the structure. In this manner, the icons for the devices may be displayed on a display in locations where a user would intuitively expect them to be.

In an embodiment, the method may further comprise providing information indicative of the location for the first icon as selected by the user to a central controller. This could be done for all of the icons for which the user selected appropriate locations on the map displayed on the display, i.e. for all of the devices for which the user was able to make the connections between the device ID and the corresponding location of the device in the structure. Providing to the central controller information indicating locations of the individual devices in the structure enables the central controller to configure the devices by e.g. setting or changing one or more operating parameters of the devices.

In an embodiment, the installed system may further comprise a control device and the method may further comprise wirelessly receiving a signal indicative of the control device being actuated, e.g., a signal indicative of the user actuating the control device in the structure, detecting a third user input indicative of a selection by the user of one or more icons of the plurality of icons displayed on the display, including at least the first icon, the one or more icons corresponding to one or more devices to be controlled by the control device, and binding (or linking) the one or more devices to the control device so that the one or more devices are controllable by the control device. This embodiment allows the user to continue the commissioning process by binding the control device(s) to one or more devices to be controlled.

In one further embodiment, the method may also comprise detecting a fourth user input indicative of a selection by the user of a location on the displayed map for a control icon corresponding to the control device, and displaying the control icon on the map at the location selected by the user. This embodiment may also, optionally, include the step of displaying on the display the control icon corresponding to the control device prior to detecting the fourth user input (i.e., a control icon is first displayed somewhere on the display, for the user, before the user can indicate where on the map the icon should be displayed). These embodiments advantageously allow placing a control icon associated with the control device of the system in a location on the displayed map that would be intuitive for the user, e.g. in a location corresponding to the physical location of the control device in the structure, thereby enabling the user to carry out the commissioning in a more efficient and faster manner.

In an embodiment, the method may further comprise providing on the display a visual indication of the one or more devices that have been bound to the control device. This embodiment provides the advantage of making the information regarding which controllable device(s) is (are) controlled by which control device(s) available to the user, thereby further assisting the user in carrying out the commissioning process because the user may easily find the necessary control device(s) to control the controllable device (s).

In an embodiment, displaying the control icon on the map may comprise overlaying the control icon over the displayed map. Similarly, displaying the first icon on the map may comprise overlaying the first icon over the displayed map.

In an embodiment, the location for the first icon on the displayed map may comprise one predefined location of a plurality of predefined selectable locations. This embodiment assists the user in positioning the icon for the first device in the appropriate place on the map by providing to the user predefined locations for the plurality of the devices from which the user can make a selection.

In an embodiment, the method may further comprise, subsequent to receiving the plurality of identification signals, providing a further command to the first device to issue a further visual cue and/or a further audio cue indicating to the user that the plurality of identification signals that has been received comprises an identification signal of the first device. This embodiment advantageously allows the controllable devices to provide feedback to the user indicating that they have been identified by the portable electronic device of the user. For example, once an identification signal of the first device has been received, the first device may be configured to either blink several times or dim down to e.g. 30%, if the first device is a light source.

In an embodiment, the method may further comprise providing one or more commands to the plurality of devices for transmitting the plurality of identification signals. This embodiment allows controlling when the commissioning process shall begin by triggering the controllable devices to transmit their identification signals.

In an embodiment, the display of the portable electronic device may comprise a touch sensitive display, also sometimes referred to as a "touch screen display" or simply "touch screen". In such an embodiment, one or more of the user inputs described herein, e.g. one or more of the first, second, third, and fourth user inputs, may comprise a movement of a physical object, such as e.g. a finger of the user or a stylus, on or near the touch screen display. In other embodiments, one or more of the user inputs described herein may be provided by other means, e.g. by means of a peripheral device such as a keyboard or a mouse.

In an embodiment, each of one or more devices of the plurality of controllable devices comprises a component of an illumination infrastructure, such as an illumination source, or a plurality of such components.

In various embodiments of the computer-implemented method described herein, the identification signal may comprise an electromagnetic signal or/and a(n) (ultra)sound signal. In a particular embodiment, the identification signal may comprise a light signal, where, as used herein, the term "light signal" refers to an optical wave of any frequency, such as e.g. visible light, infrared (IR), or ultraviolet, even though in practice visible or IR light is envisioned to be the most used.

According to an aspect of the present invention, a portable electronic device for enabling commissioning of a system installed in a structure is disclosed. The system comprises a plurality of controllable devices, each device of the plurality of devices configured for transmitting an identification signal comprising a unique identifier of the device. The portable electronic device comprises at least a wireless receiver, a display, one or more processors, a memory, and one or more programs. The one or more programs are stored in the memory and configured to be executed by the one or more processors. The one or more programs include instructions for carrying out any of the methods described herein. In various embodiments, the one or more processors may be implemented in hardware, in software, or as a hybrid solution having both hardware and software components. In an embodiment, such a portable electronic device could comprise a portable multifunction device such as e.g. a tablet computer, a smart phone, or some other device which then may be used for commissioning of the system.

In an embodiment, each device of the plurality of controllable devices comprises an illumination source configured for emitting visible light, the visible light containing the identification signal comprising the unique identifier of the device and the wireless receiver comprises an image sensor for receiving the light identification signal.

Moreover, a computer program (product) for carrying out the methods described herein, as well as a computer readable storage-medium (CRM) storing the computer program are provided. A computer program may, for example, be downloaded (updated) to the existing portable electronic devices to configure them to commission and/or control the system (e.g. to the existing remote controls, smartphones, or tablet computers), or be stored upon manufacturing of these devices. Preferably, the CRM comprises a non-transitory CRM.

Hereinafter, embodiments of the invention will be described in further detail. It should be appreciated, however, that these embodiments may not be construed as limiting the scope of protection for the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
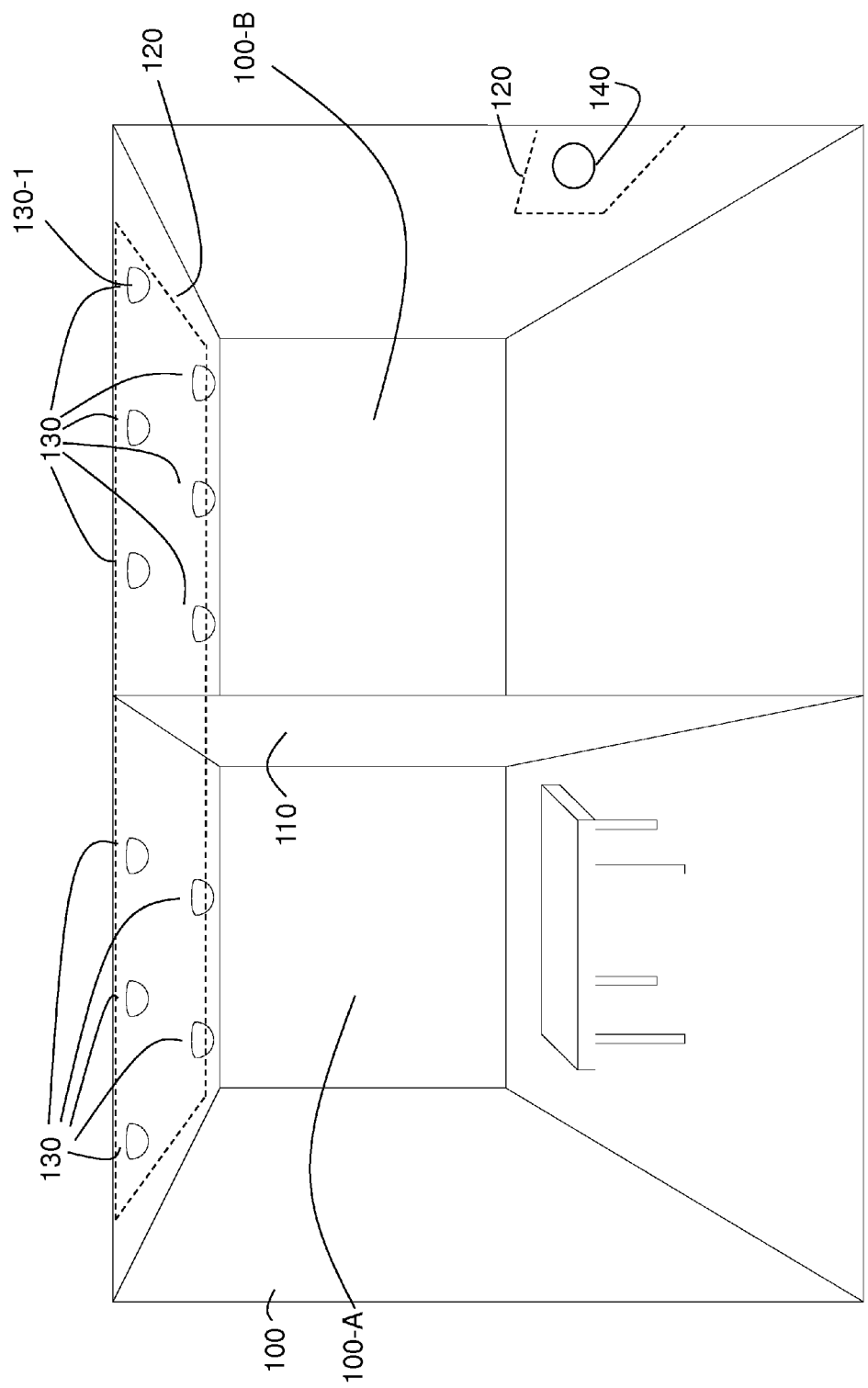
FIG. 1 is a schematic illustration of a system installed in a structure according to one embodiment of the present invention.

FIG. 1 illustrates an exemplary structure 100, according to one embodiment of the present invention. As shown in FIG. 1, the structure 100 may, optionally, be separated by a wall 110 into parts of the structure in the form of rooms 100-A and 100-B. In the structure 100 a system 120 is installed. The system 120 comprises a plurality of controllable devices 130. While the devices 130 could comprise any type of devices which may need to be commissioned, such as e.g. components of a heating system or components of a fire alarm system, in the illustrative embodiment shown in FIG. 1, the system 120 is shown as an illumination system comprising eleven light sources or luminaires 130 (five light sources—in room 100-A, and six light sources—in room 100-B). Of course, in other embodiments, the system 120 could comprise any number of devices 130 equal to or greater than two, which devices could be placed at different places within the structure. The light sources 130 may comprise any suitable sources of light such as e.g. high/low pressure gas discharge sources, laser diodes, inorganic/organic light emitting diodes, incandescent sources, or halogen sources. During operation, the light output provided by the light sources 130 contribute to the total illumination provided by the illumination system 120 for illuminating at least parts of the structure 100.

Each of the controllable devices 130 is associated with a unique ID of the device, e.g. a network address of the device. Assigning a unique ID to each of the devices allows the devices 130 to be individually identifiable within the system 120. The unique IDs could comprise system-unique addresses, such as e.g. MAC addresses of the devices, or unique identifiers associated with device types and subtypes, such as e.g. numbered downlighters versus wall washers.

Each of the controllable devices 130 is configured to transmit an identification signal comprising the unique ID of the device. The identification signals transmitted by the devices 130 allow automatic discovering of the controllable devices present in the structure 100, as described in greater detail below. In an embodiment when the devices 130 comprise light sources, the identification signals preferably comprise unique IDs encoded into the light output produced by the light sources as e.g. a series of modulations in amplitude or phase of the light signal, a technique sometimes referred to as "coded light". When the devices 130 comprise some other devices that do not emit light or when the devices 130 comprise light sources that are not configured to embed data into their light output, such devices may be retrofitted with a component that can transmit their identification signals in the form of data embedded into the light output of the component, e.g. a retrofit coded light emitter comprising an infra-red light emitting diode.

In other embodiments, it may be more beneficial if the identification signals comprise (ultra)sound signals. Selecting which type of identification signals the devices 130 should transmit may be made based e.g. on the architectural features of the structure 100. For example, in FIG. 1 it is shown that the structure may be separated by the wall 110 into two different rooms (each one of the rooms representing, in turn, a structure). If the wall 110 is such a wall that does not allow light signals to go through but does allow sound signals to go through, and if it is desirable to discover the devices 130 in rooms 100-A and 100-B at the same time, then it may be more beneficial to configure the devices 130 to transmit their IDs embedded in sound signals. If, on the other hand, the wall 110 is a glass wall through which light signals may go through but sounds signals not, and it is, again, desirable to discover all of the devices 130 at the same time, then the devices 130 could be configured to transmit their IDs embedded in light signals. In some situations, however, it may be not possible to discover the devices in the different rooms of the structure 100 at the same time, e.g.

if the detection of the identification signals transmitted by the devices is confined to a particular room. In such situations, obtaining location information as described herein has to be performed one room at a time. But even in such situations methods described herein provide significant advantages over the current approaches described in the background section, both in terms of time it takes to carry out obtaining location information and the accuracy of the obtained information, especially when there are a lot of controllable devices within a single room. In the following, for simplicity, methods are described with reference to the structure 100 with devices 130 as if the structure 100 did not have the wall 110.

In an embodiment, the structure 120 could further include one or more control devices, shown in FIG. 1 with a single control device 140, for controlling one or more of the controllable devices 130. The one or more of the control devices 140 may include e.g. switches, wall dimmers, sensors, or near field communication (NFC) tags.

In context of the structure of FIG. 1, it may be desirable to obtain location information for the devices 130 within the structure 100, e.g. as a part of a commissioning phase carried out during the (initial) installation of the system 120 or carried out at other times, and perhaps for a smaller area, when an update is required. It may further be desirable to bind, or link, the controllable devices 130 to the control devices 140 so that the one or more control devices 140 could communicate with and control the one or more of the controllable devices 130. It may further be desirable to provide information related to the location of the controllable devices 130 and, possibly, of the control devices 140 within the structure, to a central controller (not shown in FIG. 1) that could, in turn, use the location information to configure one or more parameters of one or more devices of the system 120. In addition, information indicating which controllable devices 130 are bound to which control devices 140 could also be provided to the central controller to facilitate further configuration of the system 120.

Figure 2:
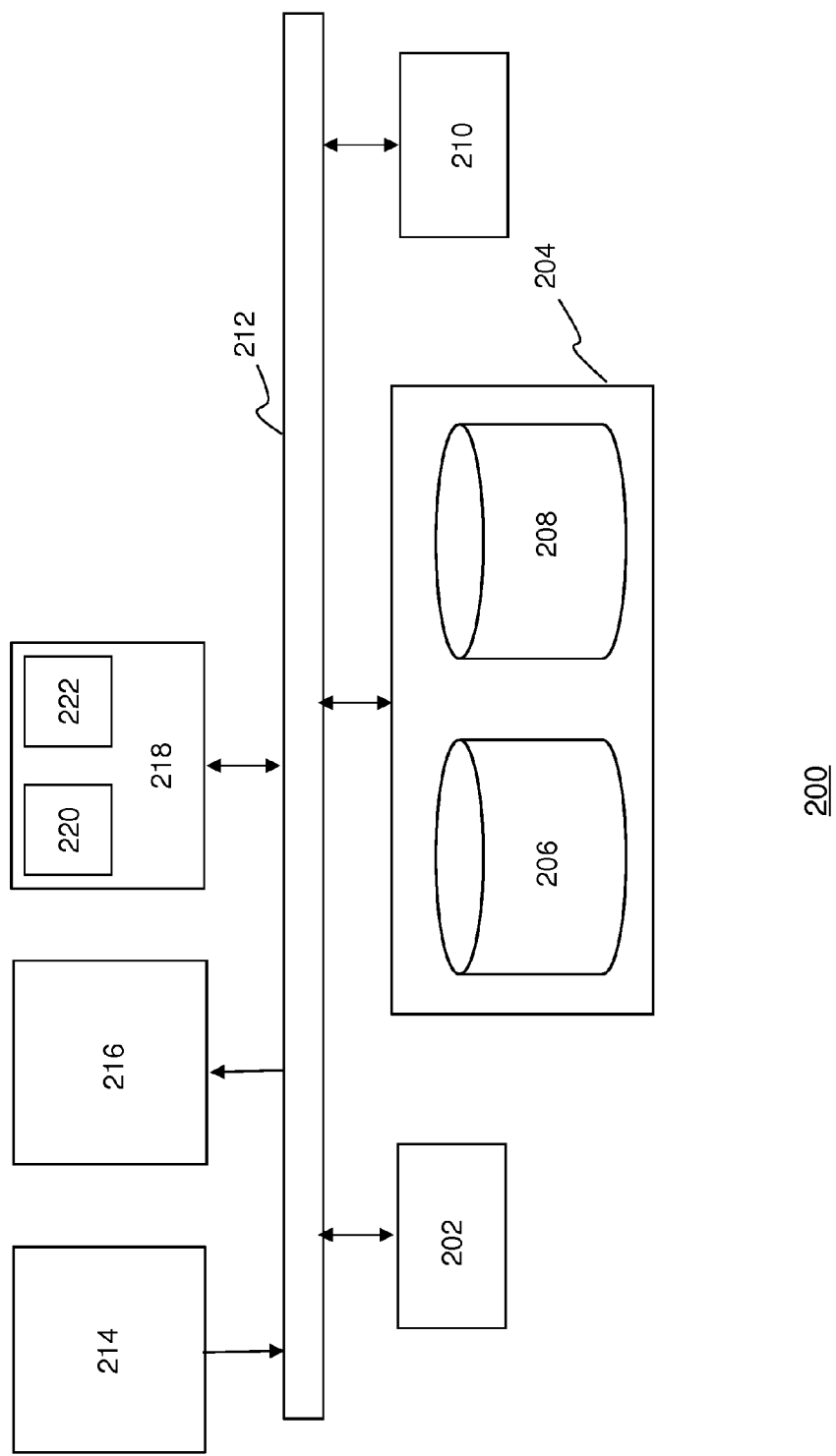
FIG. 2 is a schematic illustration of a portable electronic device, according to one embodiment of the present invention.

FIG. 2 is a schematic illustration of an electronic device 200 for carrying out methods enabling commissioning of the system 120, according to one embodiment of the present invention. Preferably, the electronic device 200 is a portable electronic device such as e.g. a tablet computer, a laptop computer, a remote control, a smart phone, a PDA, or other handheld device. As shown in FIG. 2, the electronic device 200 comprises at least one wireless receiver 202 for receiving the identification signals transmitted by the controllable devices 130, memory elements 204, and one or more processors 210 coupled to the memory elements 204 through a system bus 212. As such, the electronic device 200 may store program code within the memory elements 206. Further, the processor 210 may execute the program code accessed from memory elements 204 via the system bus 212. In one aspect, the electronic device 200 may be implemented as a computer that is suitable for storing and/or executing program code. It should be appreciated, however, that the electronic device 200 may be implemented in the form of any system including a processor and memory that is capable of performing the functions described within this specification.

The memory elements 204 may include one or more physical memory devices such as, for example, local memory 206 and one or more bulk storage devices 208. The local memory 206 may refer to random access memory or other non-persistent memory device(s) generally used during actual execution of the program code. The bulk storage devices 208 may be implemented as a hard drive or other persistent data storage device. The electronic device 200 may also include one or more cache memories (not shown) that provide temporary storage of at least some program code in order to reduce the number of times program code must be retrieved from bulk storage device during execution.

One or more output devices may also be included within or coupled to the electronic device 200. At least one output device is a monitor or display 214 for displaying data to a user, preferably via a dedicated user interface. The display 214 may comprise a touch screen display, also sometimes referred to as a "touchscreen display" or "touch-sensitive display", configured to detect and respond to contact on or near the screen. Such a display may also be considered to be an input device because it allows a user to provide user input to the electronic device 200 by making movements with a physical object such as e.g. a finger of the user or a stylus, on or near the touch screen display. Other examples of output devices which could, optionally, be also coupled to the device 200 include e.g. speakers, or the like.

The electronic device 200 may further, optionally, include one or more peripheral input devices 216. Examples of the input devices 216 may include, but are not limited to, for example, a keyboard, a pointing device such as a mouse, or the like.

Input devices and/or output devices may be coupled to the electronic device 200 either directly or through intervening I/O controllers.

A network adapter 218 may also be coupled to the electronic device 200 to enable it to become coupled to other systems, computer systems, remote network devices, and/or remote storage devices through intervening private or public networks. The network adapter may, in particular, comprise a data receiver 220 for receiving data that is transmitted by said systems, devices and/or networks to said data and a data transmitter 222 for transmitting data to said systems, devices and/or networks. Modems, cable modems, and Ethernet cards are examples of different types of network adapter that may be used with the electronic device 200.

The memory elements 204 may store an application (not shown). It should be appreciated that the electronic device 200 may further execute an operating system (not shown) that can facilitate execution of the application. Application, being implemented in the form of executable program code, can be executed by the electronic device 200, e.g., by the processor 210. Responsive to executing application, the electronic device 200 may be configured to perform one or more method steps to be described herein in further detail.

Figure 3A:
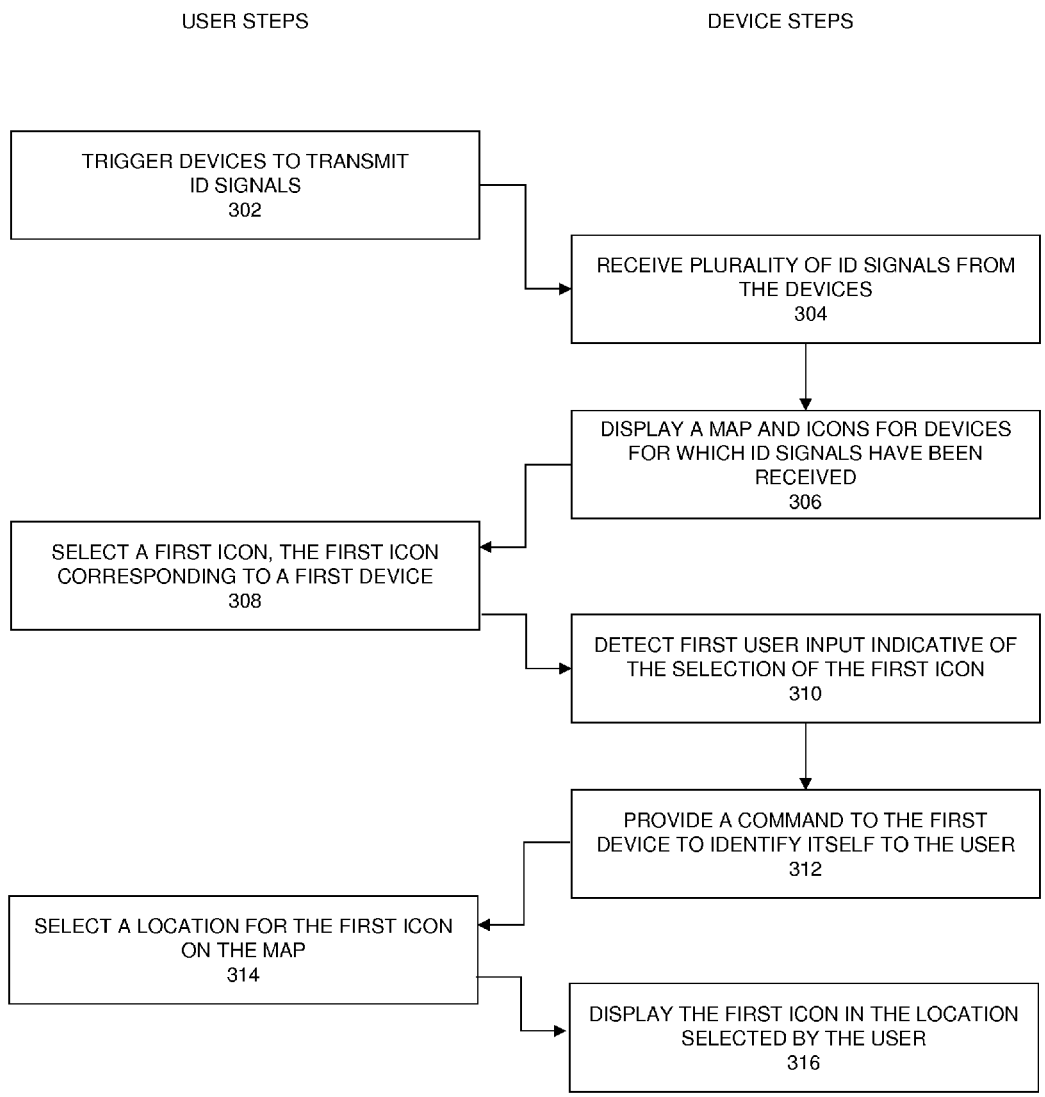
FIG. 3A is a flow diagram of method steps for enabling commissioning of a system comprising a plurality of controllable devices by obtaining location information for the controllable devices, according to one embodiment of the present invention.

FIG. 3A is a flow diagram of method steps for enabling commissioning of the system 120 comprising a plurality of the controllable devices 130, according to one embodiment of the present invention. Steps illustrated on the left side of the flow diagram of FIG. 3A are intended to indicate that the steps are performed by a user, while steps illustrated on the right side of the flow diagram of FIG. 3A are intended to indicate that the steps are performed by the electronic device 200. While the method steps are described in conjunction with the elements illustrated in FIGS. 1 and 2, persons skilled in the art will recognize that any system configured to perform the method steps, in any order, is within the scope of the present invention.

The method may begin with an optional step 302 where a trigger may be provided to the controllable devices 130 of the system 120 to start transmitting their identification signals. Such a trigger may be considered as an event initiating the commissioning procedure, or at least as an event initiating the procedure of obtaining location information for the devices 130, which information is then used for the commissioning. Thus, the triggering of step 302 enables controlled initiation of the commissioning procedure.

In one embodiment, the user may provide such a trigger, e.g. by providing user input to the electronic device 200 indicating that the trigger should be provided, and the electronic device 200 then issues the trigger. In a preferred embodiment of the methods described herein, the user provides user input to the electronic device 200 by means of making a movement or contact with or near the touch screen display 214. Thus, the electronic device 200 being configured for the receipt of such user input and, in response to that, providing one or more triggers to the devices 130 to transmit their identification signals allows the user to control the initiation of the procedure. In an embodiment, the electronic device 200 may be configured to display an icon on the display 214 by means of which the user can provide such a trigger, such as e.g. a start button 416, shown in FIG. 4A and described below.

In another embodiment, it is a central controller (not shown in FIGS. 1 and 2) in charge of controlling the system 120 that may be configured for providing such a trigger to the devices 130. In this manner, the commissioning procedure for the controllable devices 130 may be centrally managed.

In one further embodiment, the trigger to the devices 130 may be provided for all the devices 130 simultaneously, e.g. in a form of a broadcast or multicast signal, provided that the devices 130 are configured to observe such signals. In an alternative further embodiment, triggering of step 302 could comprise providing individual triggers to the different devices 130 sequentially, e.g. in a form of unicast signal, thereby ensuring that when one device 130 is transmitting its identification signal to be detected by the electronic device 200, the other devices 130 are not transmitting their identification signals (i.e., the other devices are "silent"), which simplifies detection and differentiation of the various signals and decoding of unique identifiers and possible other data which may be encoded in them.

Preferably, the trigger of step 302 is provided using the WiFi network, connecting the electronic device 200 to the devices of the system 120, e.g. directly via the lighting control network (if WiFi enabled) or via a dedicated gateway translating WiFi commands to the specific communication protocol used by the lighting system (e.g. DALI), either through the IT network of the structure 100 or the building in which the structure resides and/or through a WiFi hotspot/router to be carried along by the user of the electronic device 200 during performance of the steps of FIG. 3. These considerations also apply to other steps described herein which may include the use of WiFi connectivity.

In place of using WiFi to trigger the devices 130, other techniques may also be used—e.g. triggering the devices 130 with an infrared remote or by triggering a light sensor possibly imbedded in the devices 130 with a laser pointer or a flashlight. This also applies to other steps described herein where the devices within the system 120 are triggered.

In a preferred embodiment, the devices 130 transmit their identification signals via visible light communications, i.e. by communicating their identifiers via the light output produced by light sources, either when the devices 130 are light sources themselves or are equipped with designated light sources capable of transmitting the identification signals of the devices. Such communications is a promising way of enabling localized wireless data exchange because a wide unlicensed frequency band is available for this and because light emitting diodes (LEDs) used to illuminate a room or a space can be applied to provide the communications. One visible light communications technique is based on embedding data into the light output of a light source by modulating the light output of the light source in response to a (repeating) data signal, e.g. by modulating the drive current applied to the light source to produce the light output. Other techniques are also known in the art and, therefore, are not described here in detail. Preferably, the light output is modulated at a high frequency so that the modulation is invisible to the humans.

In step 304, the electronic device 200 receives the plurality of identification signals from the devices 130 via the appropriately configured wireless receiver 202. If the identification signals comprise light signals as described above, the wireless receiver 202 may include a front camera included within the electronic device 200 (e.g. smart phones and tablet computers typically have cameras built into them), a photodiode dongle, or some other type of light sensor capable of detecting the identification signals and deriving the identifiers of the devices 130 encoded in them. Selection of a particular type of the wireless receiver 202 would depend on the type of signal used for transmitting the identifications of the devices and on the type of encoding used to encode IDs into the identification signal. Various detections techniques are known and, therefore, are not described here.

It may be possible that complete and correct receipt and detection of the identification signals transmitted from the different devices 130 requires that the user positions the electronic device 200 in space correctly. For example, if the identification signals are provided in the form of light signals and the wireless receiver of the electronic device 200 is an image sensor, it may be necessary that the image sensor is oriented a certain way in order to capture the signals. To enable such adequate receipt and detection of the identification signals, the electronic device 200 may be configured to display, on the display 214, one or more instructions assisting the user in correctly positioning the device 200. For example, the electronic device 200 may be configured to display an object, e.g. a white square, on the display 214, which would indicate how the user should aim the device 200 to capture the identification signals.

In an embodiment, once the electronic device 200 has determined the identification signal received from a particular device 130, the electronic device 200 then provides a command to that device 130, e.g. via the WiFi connection, triggering the device 130 to provide an indication to the user that it has been discovered. For example, the device 130 emitting light at a particular intensity previously to the detection, could then increase or decrease the intensity so that it is noticeable to the user.

In step 306, the electronic device 200 displays, on the display 214, via e.g. a user interface, a floor plan or a map of the structure 100 as well as icons for those devices 130 for which the device 200 received identification signals in step 304. In an embodiment, at that point, the icons for the devices 130 could be displayed as an overlay over the map. But, preferably, since at that point it is not yet known where the icons should be displayed with respect to the map because location information of the devices 130 in the structure is not yet known, the icons are displayed separately from the map. Further, step 306 is not limited to displaying the map and the icons for the first time at the same time. For example, the map may already be displayed to the user before the electronic device 200 discovered which ones of the devices 130 are present in the structure 100 by receiving their identification signals in step 304. After the electronic device 200 identified the devices 130 present, it may add the icons for the discovered devices to the user interface displaying the map. Such a scenario is schematically illustrated in FIGS. 4A and 4B.

Figure 4A:
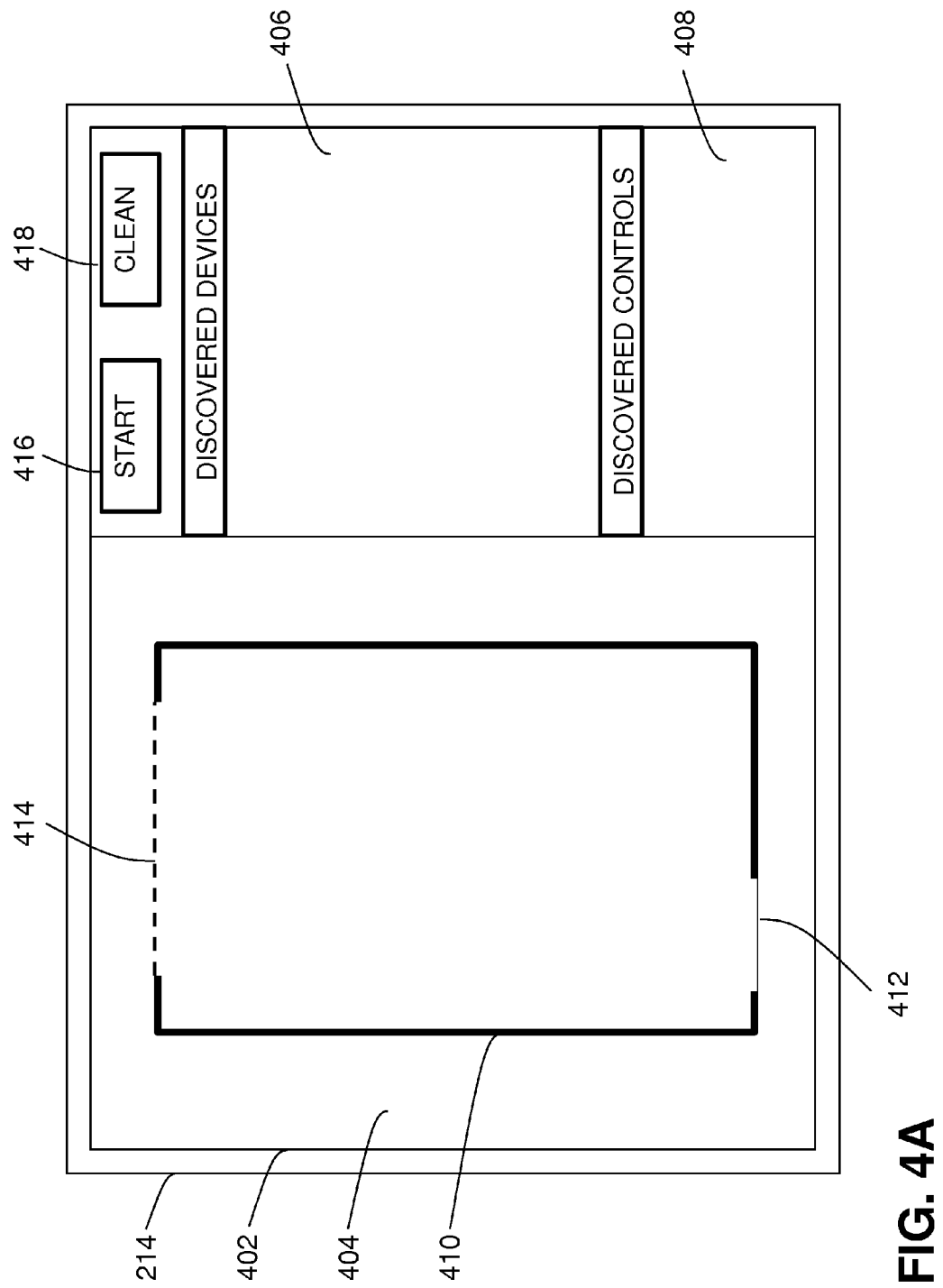
FIGS. 4A-4I are schematic illustrations of a display displaying an exemplary user interface at various stages of the method steps of FIGS. 3A and 3B, according to various embodiments of the present invention.
Figure 4B:
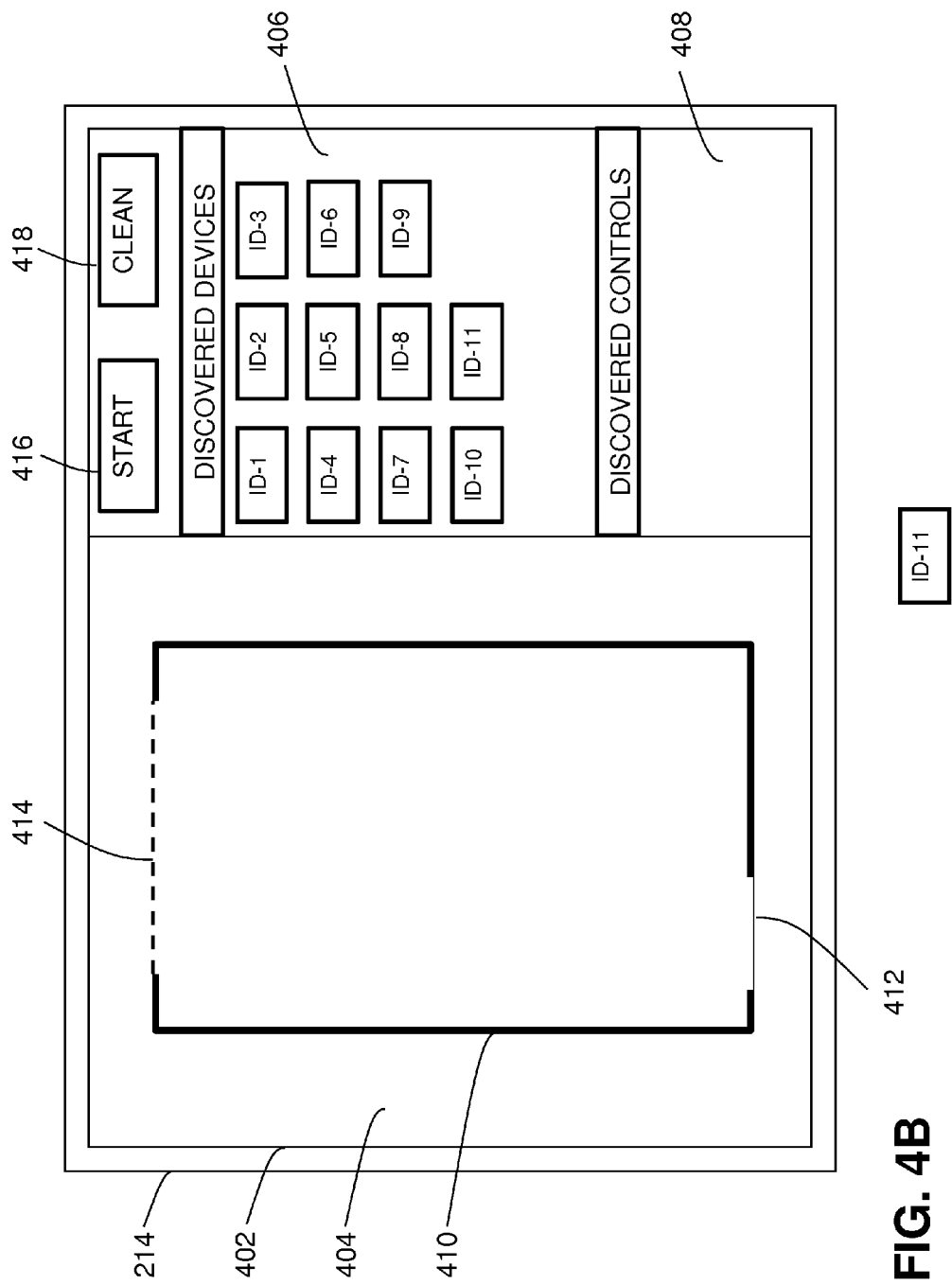

FIG. 4A illustrates the display 214 displaying an exemplary user interface 402 divided into sections 404, 406, and 408. The section 404 may display a map 410 of the structure 100, the map 410 indicating that the structure 100 is a single room comprising a door 412, shown as an opening, and a window 414, shown as a dashed line. The section 406 is intended to display icons of the devices 130 for which the electronic device 200 received the identification signals and the section 408 is intended to display icons of any control devices which may be present within the system 120 and which the electronic device 200 has identified. The sections 406 and 408 are shown in FIG. 4A as not containing any components yet as the devices 130 and the controls of the system 120 have not yet been identified. On the other hand, FIG. 4B, which shows the user interface 402 after devices 130 have been discovered in step 304, illustrates icons for the devices 130 present within the structure 100, the icons shown as icons ID-1 through ID-11 displayed in the section 406 of the discovered controllable devices. In an embodiment, the icons ID-1 through ID-11 may appear on the display 214 one at a time, e.g. as the electronic device 200 receives and decodes their identification signals. Displaying a new icon for the discovered device on the display and triggering the corresponding device to provide a feedback to the user substantially simultaneously with the display of the new icon allows filling up of the list of the discovered devices in a manner that is intuitive for the user: e.g. a new icon pops up in the list of the discovered devices and a corresponding device decreases it's illumination intensity by 30%.

As also shown in FIG. 4A, the user interface 402 may further comprise a "start" icon 416 and a "clean" icon 418. By touching the "start" icon 416, e.g. with a finger or a stylus, step 302 described above may be enabled where a user can initiate the start of the commissioning procedure where location information for the devices 130 is obtained (i.e., in response to detecting user input indicating that the user touched the icon 416, the electronic device 200 can issue trigger(s) to the devices 130 to start transmitting their identification signals). By touching the "clean" icon 418, a user can clean out the contents of one or more of the sections of the user interface 402, e.g. in order to start a new commissioning procedure.

Figure 4C:
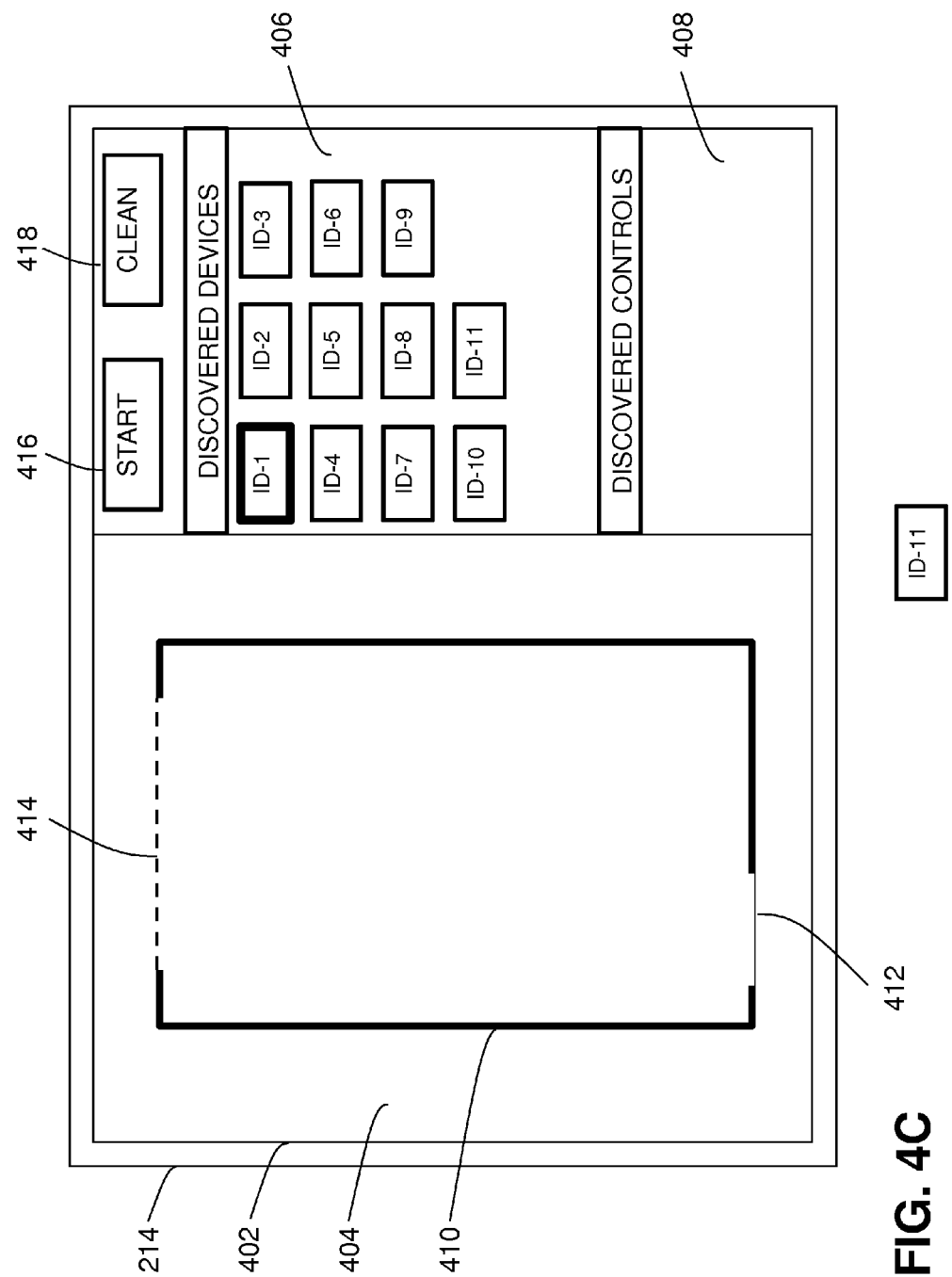

Once the map and the icons for the discovered devices have been displayed for the user, the method proceeds to step 308 where the user may select one of the icons displayed in the section 406 in order to move the icon to the map. For the sake of illustration, it can be assumed that the user selected icon ID-1, corresponding to the device 130-1 within the structure 100. FIG. 4C illustrates that the icon ID-1 has been selected by showing the border of that icon as being thicker than that of the other icons in section 406.

In step 310, the electronic device 200 receives user input indicating selection of that icon and, in step 312, the electronic device 200 provides a trigger to the device 130-1 to identify itself to the user, e.g. by means of a visual or audio signaling. Step 312 is performed in order to trigger a feedback from the device 130-1 to the user so that the user can identify the exact physical device within the structure 100 the icon for which the user has selected on the display 214. For example, once the icon ID-1 has been selected, the corresponding device 130-1 in the structure 100 could blink several times or it could increase or decrease the intensity of the light emitted so that the change is noticeable to the user. Alternatively or additionally, the device 130-1 could provide an audio indication to the user, e.g. it may beep one or more times. Any manners in which the device for which the icon was selected on the display could identify itself to the user are within the scope of the present invention.

In a preferred embodiment, the electronic device 200 can provide the trigger in step 312 by means of a WiFi connection. However, other techniques may also be used, such as e.g. triggering the devices 130 with an infrared remote or by triggering a light sensor possibly imbedded in the devices 130 with a laser pointer or a flashlight.

Figure 4D:
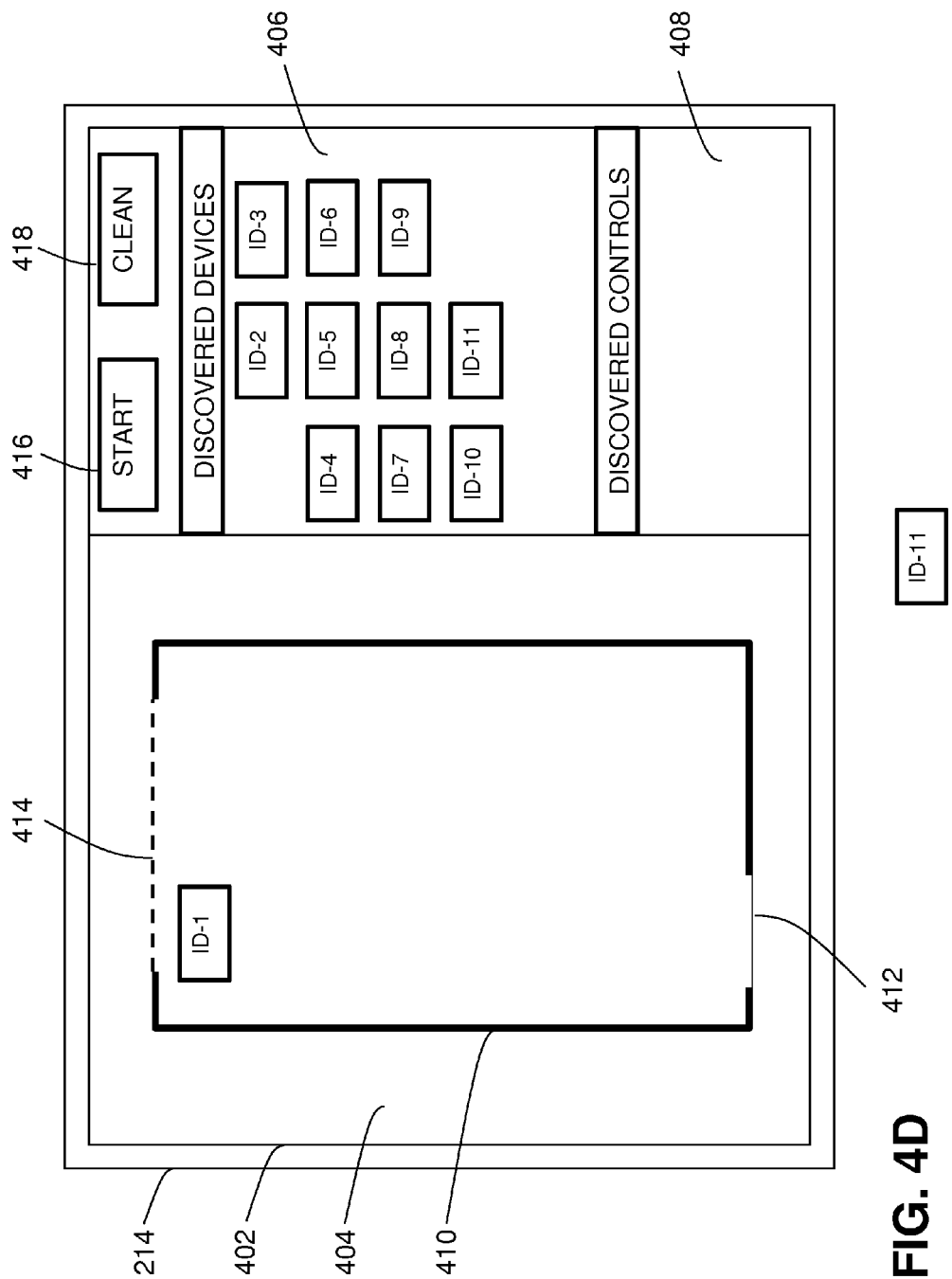

Once the user has identified the actual device 130-1 for which the user has selected the icon on the display based on the feedback provided by the device 130-1 after the trigger of step 312, the user selects an appropriate location on the displayed map for the icon for the device (step 314). Preferably, the location on the displayed map corresponds to the location of the selected device within the actual physical structure. Such a placement of the icons on the map would be intuitive for further configuration of the devices which would be performed by a commissioning engineer. In response to the user's selection in step 314, in step 316 the electronic device 200 displays the icon ID-1 on the map displayed on the display 214 at the location selected by the user. This is schematically illustrated in FIG. 4D where the icon ID-1 has been moved from being displayed on the list of discovered devices in section 406 and displayed on the map 410 in the location selected by the user. Of course, in other embodiments, the icon ID-1 may appear not only on the map 410 but also, still, on the list of discovered devices in the section 406.

Figure 4E:
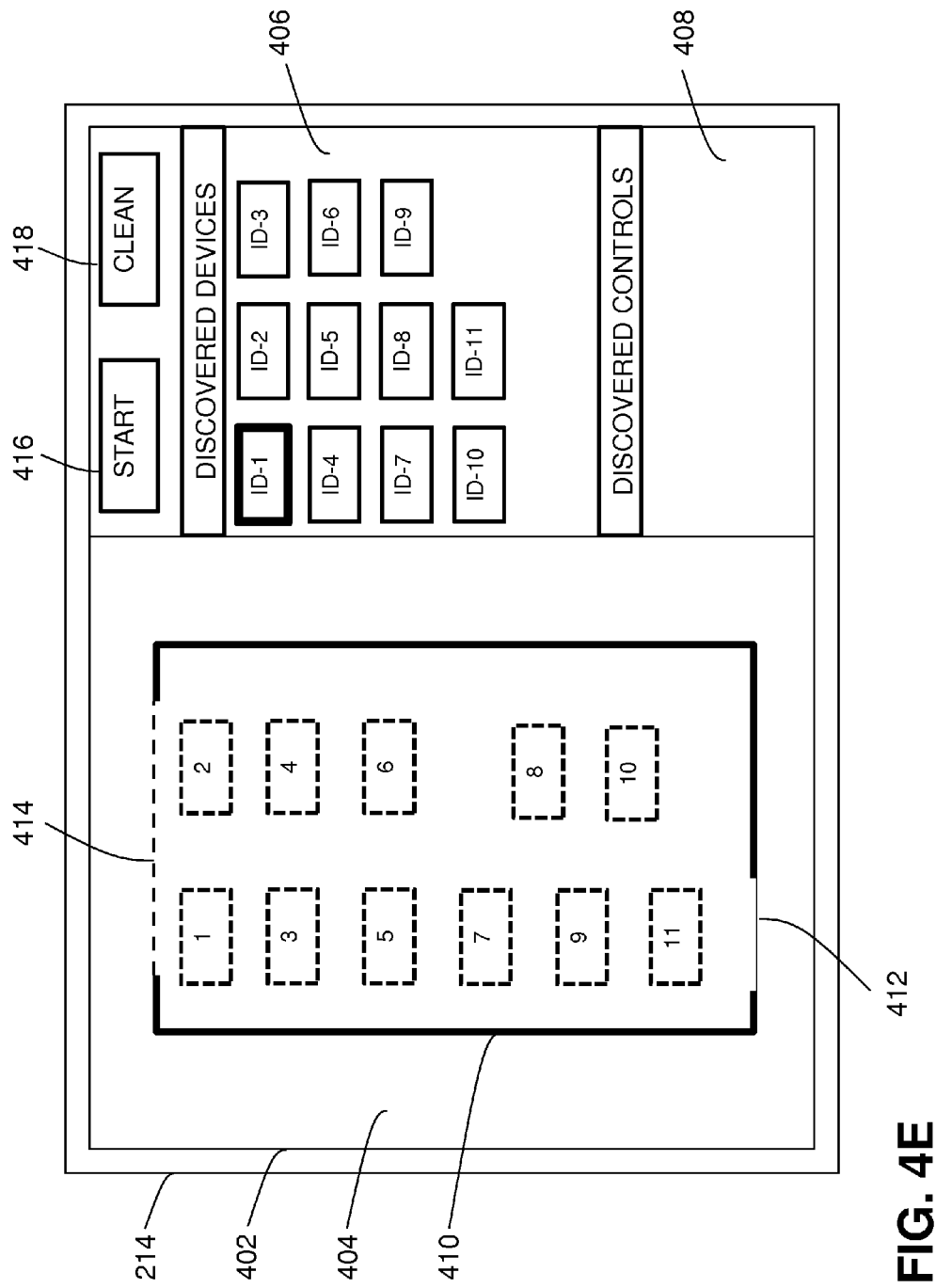

In an embodiment, in order to assist the user with selecting the location for the icons on the map, the electronic device 200 may indicate possible locations for the devices 130 on the map 410, as shown in FIG. 4E with locations 1 through 11, shown with rectangles having dashed lines. In step 314 the user then has to select one of these locations as the location for the icon ID-1.

Steps 308-316 can be implemented with the user making a single swift "drag-and-drop" movement where the user select an icon on the list of the discovered devices by making a movement at or near the touch screen display 214, then sees or hears the corresponding device identifying itself to the user, and then drags and drops the selected icon to the appropriate location on the map 410. But, a person skilled in the art will recognize that even though such movement may appear as a single user input, it still falls under the scope of the present invention differentiating between a user input selecting an icon for one of the controllable devices from the list of the icons for the devices that have been discovered and a user input selecting a location for such an icon on the displayed map.

Figure 4F:
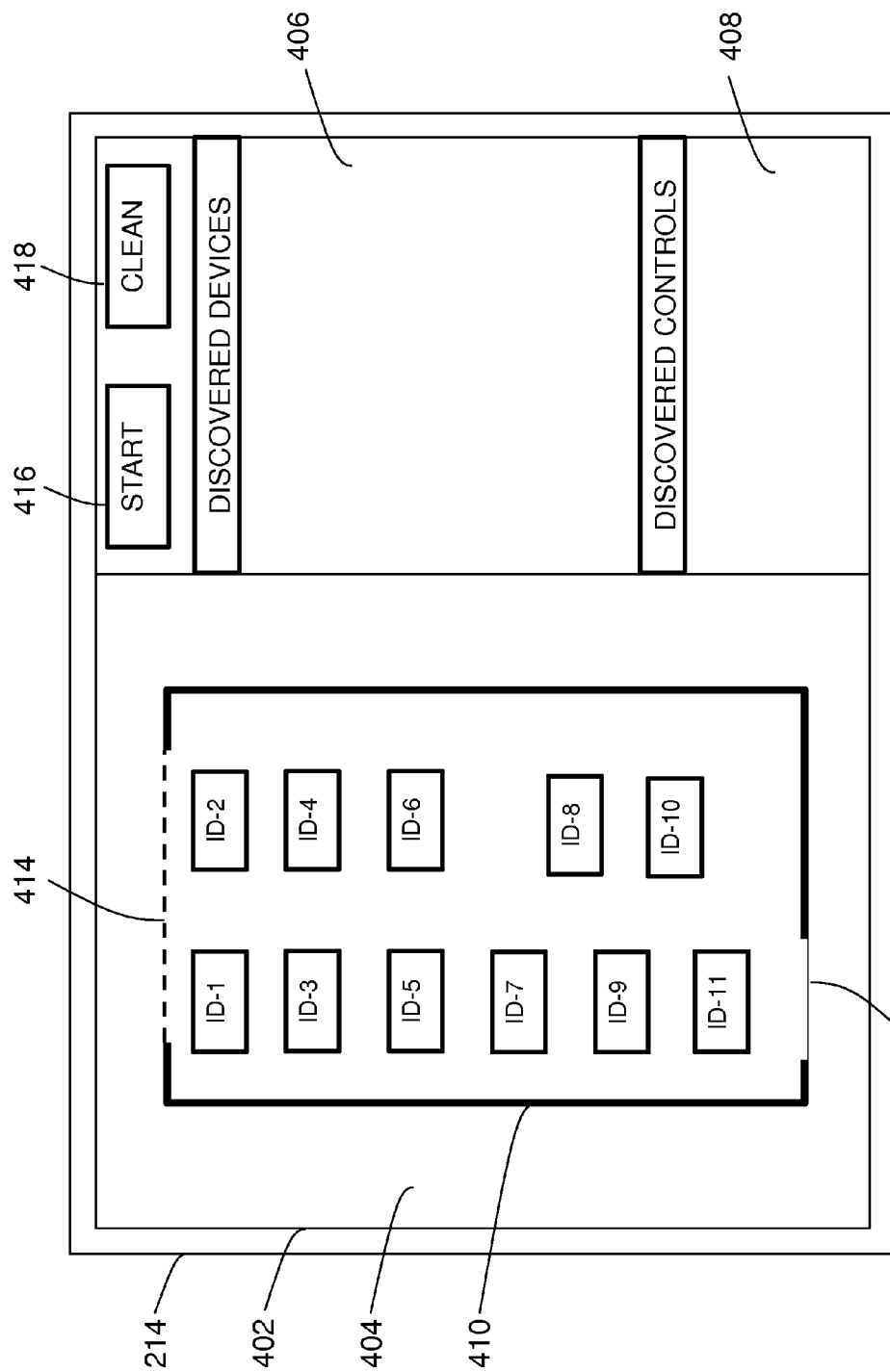

Steps 308-316 may then be repeated in order to place other icons for the devices 130 that have been discovered in the appropriate locations on the map 410. FIG. 4F illustrates the map 410 populated with the icons for the discovered devices 130.

Once the icons for the discovered devices have been placed in the appropriate locations on the map 410, the information indicative of the locations could be provided to the central controller which may then use the information to set parameters of the devices 130.

Figure 3B:
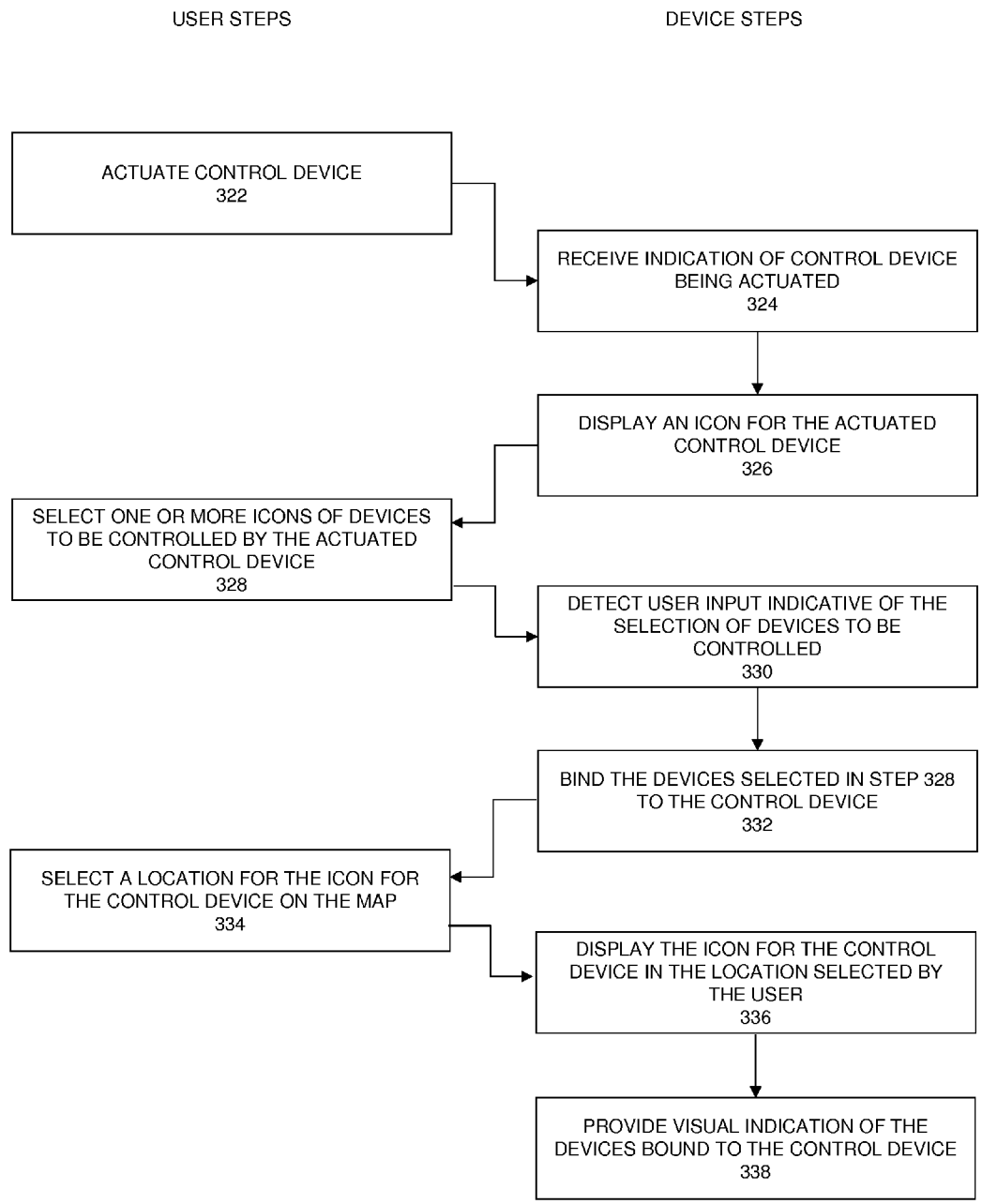
FIG. 3B is a flow diagram of method steps for enabling commissioning of a system by binding one or more of controllable devices to a control device, according to one embodiment of the present invention.

In an embodiment, the method of FIG. 3A may then proceed with additional steps, shown in FIG. 3B, in order to bind the discovered and located devices 130 to the appropriate control devices for controlling the devices 130.

FIG. 3B is a flow diagram of method steps for enabling commissioning of the system 120 by binding one or more of the controllable devices 130 to the control device 140, according to one embodiment of the present invention. Steps illustrated on the left side of the flow diagram of FIG. 3B are intended to indicate that the steps are performed by a user, while steps illustrated on the right side of the flow diagram of FIG. 3B are intended to indicate that the steps are performed by the electronic device 200. While the method steps are described in conjunction with the elements illustrated in FIGS. 1 and 2, persons skilled in the art will recognize that any system configured to perform the method steps, in any order, is within the scope of the present invention.

Figure 4G:
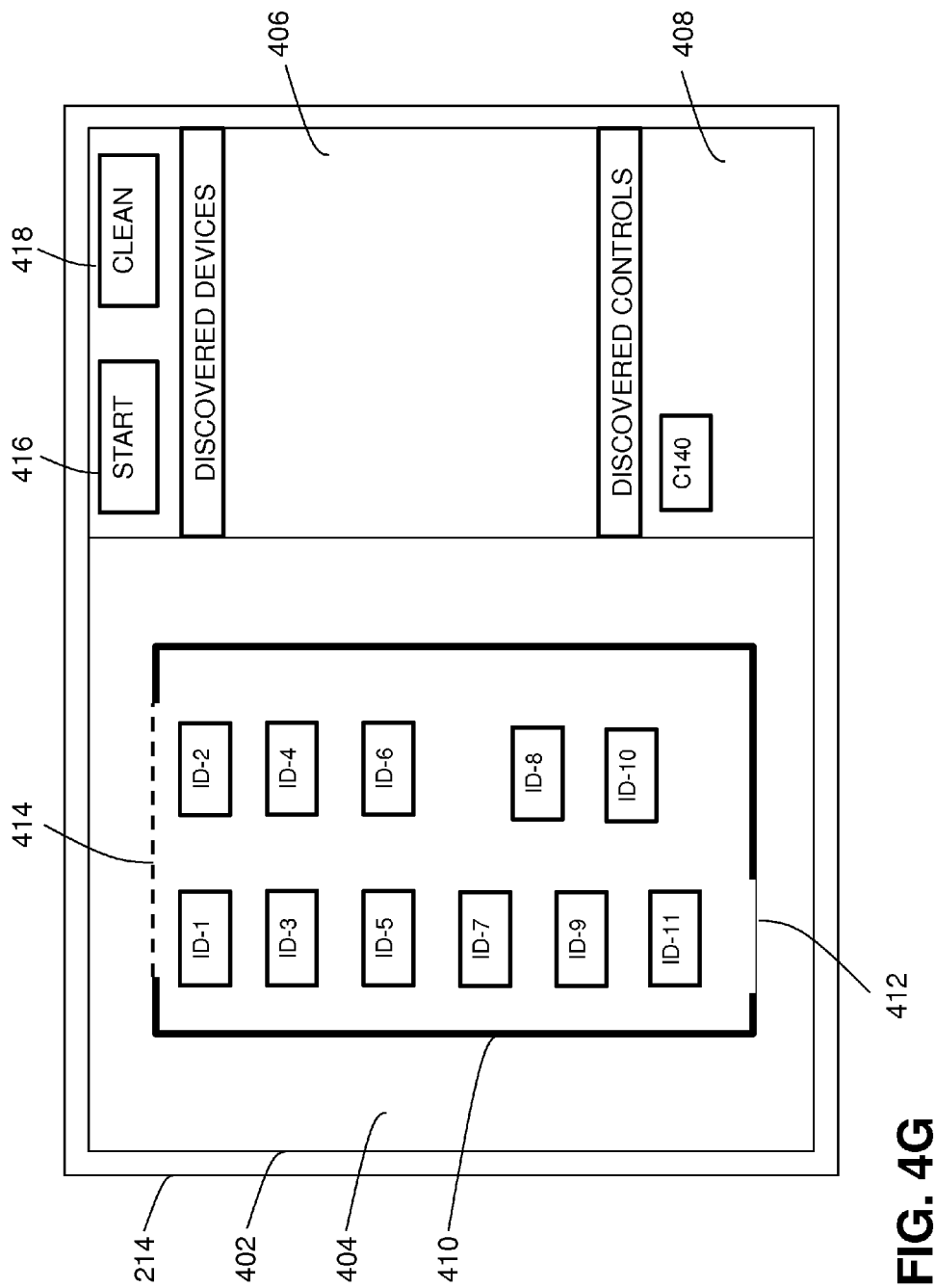

In step 322 of FIG. 3B the user actuates a particular control device in the room, e.g. the control device 140. If the control device 140 is a switch, then the user actuating that device may comprise the user switching the switch from one position (e.g. OFF) to another position (e.g. ON). Once the control device 140 has been actuated by the user, the control device 140 may provide a signal to the electronic device 200 indicating that it has been actuated, e.g. via the WiFi connection between the control device 140 and the electronic device 200. The electronic device 200 is, in turn, configured to wirelessly receive a signal indicative of the control device 140 being actuated (step 324). Subsequent to receiving such a signal the electronic device 200 may display an icon corresponding to the actuated control device 140 to the user in the optional step 326, shown in FIG. 4G with an icon C140.

Figure 4H:
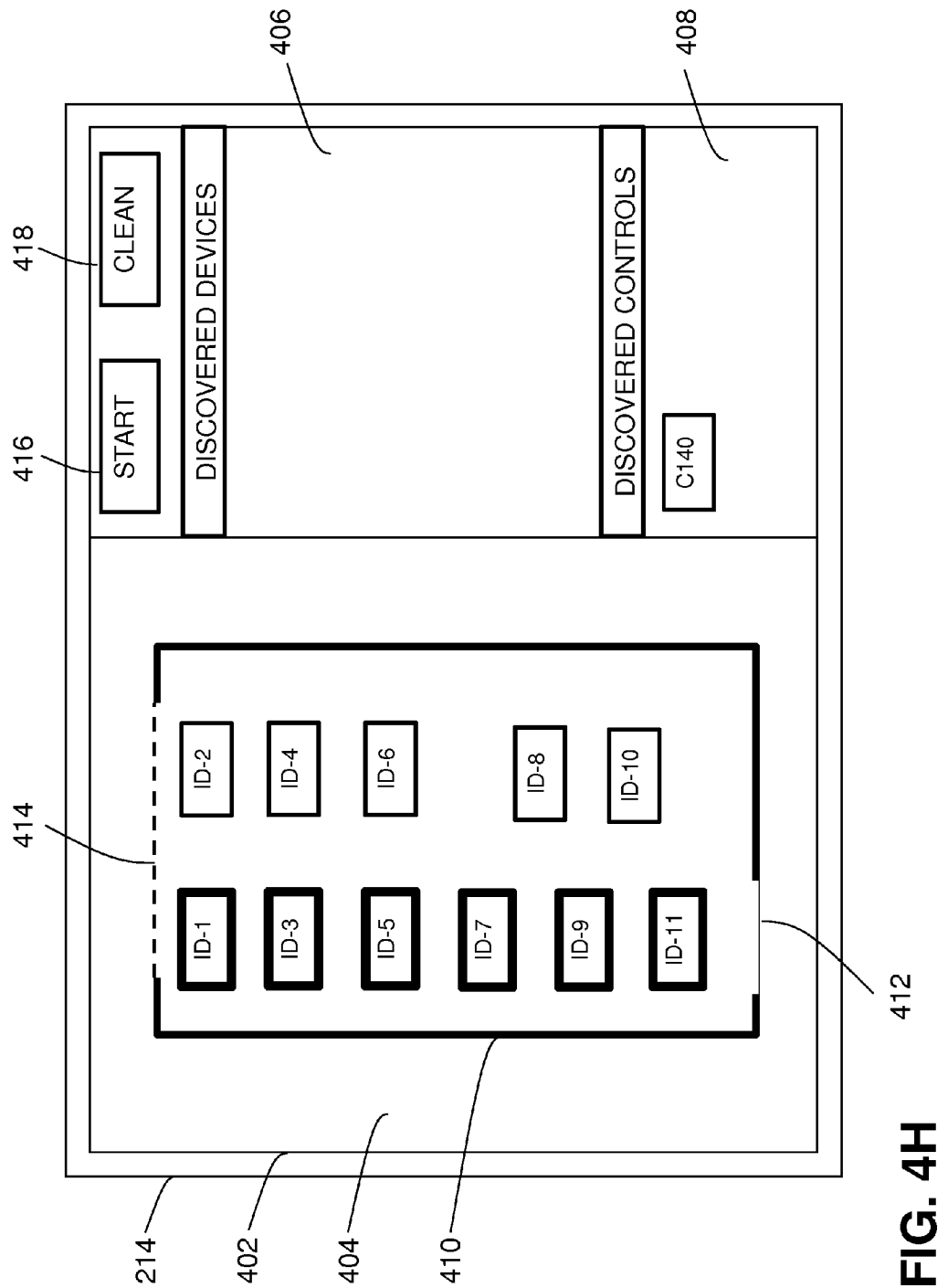

The method then proceeds to step 328, where the user selects one or more icons displayed on the map 410 to indicate which ones of the devices 130 should be linked to the control device 140. This is illustrated in FIG. 4H with icons ID-1, ID-3, ID-5, ID-7, ID-9, and ID-11 being selected by the user, as shown with thick lines surrounding these icons.

In step 330, the electronic device 200 receives a user input indicating the devices to be controlled that the user selected in step 328 and, in step 332, the electronic device 200 provides a command to bind the one or more devices 130 selected in step 328 to the control device 140 so that the selected devices 130 are controllable by the control device 140. In an embodiment, the user can initiate binding of the devices selected in step 328 to the actuated control device 140 by selecting a particular icon within the user interface 402, such as e.g. an icon "CREATE BINDING" 420, shown in FIG. 4H. In other embodiments, the electronic device 200 may be configured to create bindings automatically after the electronic device 200 received an indication that a particular control device has been actuated and after the electronic device 200 received user input indicating selection of some of the icons for the discovered devices 130 to be controlled by the actuated control device.

Figure 4I:
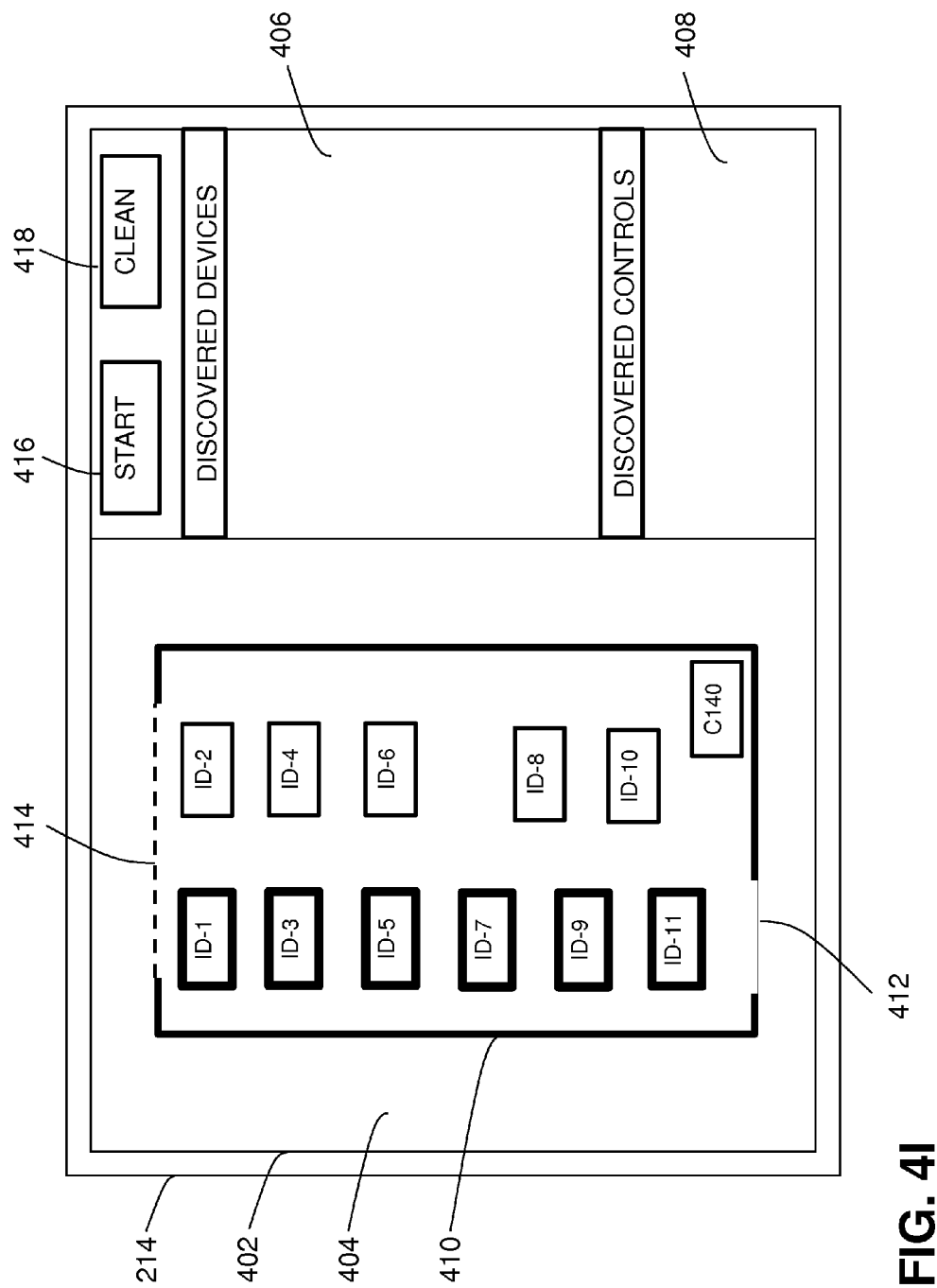

The method of FIG. 3B may also include an optional step 334 enabling the user to select a location for the icon for the control device on the map 410 as well as an optional step 336 where the electronic device 200 could display the icon for the control device at the location on the map 410 selected by the user in step 336. This is schematically illustrated in FIG. 4I where the icon C140 has been moved from being displayed on the list of discovered control devices in section 408 and displayed on the map 410 in the location selected by the user. Of course, in other embodiments, the icon C140 may appear not only on the map 410 but also, still, on the list of discovered control devices in the section 408. In an embodiment similar to when the user was selecting the locations for the icons of the devices to be controlled on the map, in order to assist the user with selecting the location for the icon of the control device 140 on the map, the electronic device 200 may indicate possible locations for the device 140 on the map 410 (not shown in figures). The optional steps 334 and 336 may be performed at any point after the optional step 326, not necessarily in the order illustrated in FIG. 3B.

The method of FIG. 3B may also include an optional step 338 where the electronic device 200 provides a visual indication on the display 214 of the one or more devices 130 that have been bound to the control device 140. The optional step 338 may be performed at any point after the step 332, not necessarily in the order illustrated in FIG. 3B.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the one or more processors 210, described herein.

While the forgoing is directed to embodiments of the present invention, other and further embodiments of the invention may be devised without departing from the basic scope thereof. For example, aspects of the present invention may be implemented in hardware or software or in a combination of hardware and software. Therefore, the scope of the present invention is determined by the claims that follow.

The invention claimed is:

1. A method for mapping a plurality of controllable devices of a system installed in a structure by means of a portable electronic device comprising a wireless receiver, a display, a processor, and a memory, each controllable device of the plurality of controllable devices configured to transmit an identification signal comprising a unique identifier of the controllable device, the method comprising:

sending one or more triggers produced by the portable electronic device to the plurality of controllable devices to cause the plurality of controllable devices to transmit a plurality of identification signals to control initiation of a commissioning process;

wirelessly receiving, by the portable electronic device, the plurality of identification signals transmitted from the plurality of controllable devices;

sending, by the portable electronic device, subsequent to receiving at least one identification signal of the plurality of identification signals, a first trigger to a first controllable device of the plurality of controllable devices to issue a visual cue or an audio cue at the first controllable device indicating to a user that the at least one identification signal has been received by the portable electronic device;

displaying on the display a map of the structure and a plurality of icons corresponding to the plurality of controllable devices for which the plurality of identification signals has been received;

detecting a first user input indicative of a selection by the user of a first icon of the plurality of icons displayed on the display, the first icon corresponding to the first controllable device;

sending, by the portable electronic device, in response to detecting the first user input, a second trigger to the first controllable device to issue a visual cue or an audio cue identifying the first controllable device to the user;

detecting, subsequent to the first controllable device issuing the visual cue or the audio cue, a second user input indicative of a selection by the user of a location on the map displayed on the display for the first icon; and displaying the first icon on the map displayed on the display in the location selected by the user;

wherein each of the plurality of controllable devices comprises an illumination source configured for emitting visible light, the visible light containing the identification signal comprising the unique identifier of the device and wherein the wireless receiver comprises an image sensor for receiving the light identification signal.

2. The method according to claim 1, further comprising providing information indicative of the location for the first icon as selected by the user to a central controller.

3. The method according to claim 1, wherein the system further comprises a control device, the method further comprising:

wirelessly receiving a signal indicative of the control device being actuated;

detecting a third user input indicative of a selection by the user of one or more icons of the plurality of icons displayed on the display, including at least the first icon, the one or more icons corresponding to one or more devices to be controlled by the control device; and binding the one or more devices to the control device so that the one or more devices are controllable by the control device.

4. The method according to claim 3, further comprising:

detecting a fourth user input indicative of a selection by the user of a location on the map displayed on the display for a control icon corresponding to the control device; and displaying the control icon on the map displayed on the display in the location selected by the user.

5. The method according to claim 4, further comprising providing on the display a visual indication of the one or more devices that have been bound to the control device.

6. The method according to claim 4, wherein displaying the control icon on the map comprises overlaying the control icon over the map displayed on the display.

7. The method according to claim 1, wherein displaying the first icon on the map comprises overlaying the first icon over the map displayed on the display.

8. The method according to claim 1, wherein the location for the first icon on the displayed map comprises one predefined location of a plurality of predefined locations.

9. The method according to claim 1, wherein the display comprises a touch sensitive display and wherein the first user input comprises a first movement of a physical object on or near the touch sensitive display or the second user input comprises a second movement of the physical object on or near the touch sensitive display.

10. The method according to claim 1, wherein each of one or more devices of the plurality of devices comprises a component of an illumination infrastructure or a plurality of such components.

11. A portable electronic device for mapping a plurality of controllable devices of a system installed in a structure, each controllable device of the plurality of controllable devices configured to transmit an identification signal comprising a unique identifier of the controllable device, the portable electronic device comprising:

a wireless receiver, a display, one or more processors, a memory, and one or more programs, wherein the one or more programs are stored in the memory and configured to be executed by the one or more processors, the portable electronic device configured to:

send one or more triggers to the plurality of controllable devices to cause the plurality of controllable devices to transmit a plurality of identification signals to control initiation of a commissioning process;

wirelessly receive the plurality of identification signals transmitted from the plurality of controllable devices;

subsequent to receiving at least one identification signal of the plurality of identification signals, send a first trigger to at least one controllable device of the plurality of controllable devices to issue a visual cue or an audio cue at the at least one controllable device indicating to a user that the at least one identification signal has been received by the portable electronic device;

display on the display a map of the structure and a plurality of icons corresponding to the plurality of controllable devices for which the plurality of identification signals has been received;

receive a first user input indicative of a selection by the user of a first icon of the plurality of icons displayed on the display, the first icon corresponding to the at least one controllable device;

in response to receiving the first user input, send a second trigger to the at least one controllable device to issue a visual cue or an audio cue identifying the at least one controllable device to the user;

subsequent to the at least one controllable device issuing the visual cue or the audio cue, receive a second user input indicative of a selection by the user of a location on the map displayed on the display for the first icon; and display the first icon on the map displayed on the display in the location selected by the user;

wherein each of the plurality of controllable devices comprises an illumination source configured for emitting visible light, the visible light containing the identification signal comprising the unique identifier of the device and wherein the wireless receiver comprises an image sensor for receiving the light identification signal.

12. A non-transitory computer program product with instructions configured by execution by one or more processors, which when executed by a portable electronic device comprising a wireless receiver, a display, a memory, and the one or more processors, cause the device to map a plurality of controllable devices of a system installed in a structure by means of the portable electronic device, each of the plurality of controllable devices configured to transmit an identification signal comprising a unique identifier of the controllable device, the method comprising:

sending one or more triggers produced by the portable electronic device to the plurality of controllable devices to cause the plurality of controllable devices to transmit a plurality of identification signals to control initiation of a commissioning process;

wirelessly receiving, by the portable electronic device, the plurality of identification signals transmitted from the plurality of controllable devices;

sending, by the portable electronic device, subsequent to receiving at least one identification signal of the plurality of identification signals, a first trigger to a first controllable device of the plurality of controllable devices to issue a visual cue or an audio cue at the first controllable device indicating to a user that the at least one identification signal has been received by the portable electronic device;

displaying on the display a map of the structure and a plurality of icons corresponding to the plurality of controllable devices for which the plurality of identification signals has been received;

detecting a first user input indicative of a selection by the user of a first icon of the plurality of icons displayed on the display, the first icon corresponding to the first controllable device;

sending, by the portable electronic device, in response to detecting the first user input, a second trigger to the first controllable device to issue a visual cue or an audio cue identifying the first controllable device to the user;

detecting, subsequent to the first controllable device issuing the visual cue or the audio cue, a second user input indicative of a selection by the user of a location on the map displayed on the display for the first icon; and displaying the first icon on the map displayed on the display in the location selected by the user;

wherein each of the plurality of controllable devices comprises an illumination source configured for emitting visible light, the visible light containing the identification signal comprising the unique identifier of the device and wherein the wireless receiver comprises an image sensor for receiving the light identification signal.

* * * * *